Patented Sept. 30, 1952

2,612,471

UNITED STATES PATENT OFFICE 2,612,471

OIL-BASE DRILLING FLUIDS

Paul W. Fischer, Whittier, Calif., assignor to Union Oil Company of California, Los Angeles, Calif., a corporation of California No Drawing. Application February 19, 1951, Serial No. 211,797

10 Claims. (Cl. 252—8.5)

This invention relates to drilling fluids such as are used in the rotary drilling of oil and gas wells, and in particular concerns oil-base drilling fluids of a particular type adapted for use in the presence of water and hydratable clays.

In drilling oil or gas wells by means of rotary drilling tools, a hollow drill pipe known as a drill stem having a bit attached to its lower end is extended downwardly through the well bore and rotated while the bit is pressed against the working face in the formation at the bottom of the hole. The action of the rotating bit grinds away the formation as the drilling progresses. During the drilling, a fluid body known as a drilling fluid or mud is continuously circulated downwardly through the drill stem, through the bit and against the working face of the hole, and then upwardly through the annular space between the drill stem and the wall of the bore hole. The drilling fluid serves a number of purposes, among which are cooling and lubricating the drill bit, suspending and removing cuttings from the bore hole, preventing the flow of liquids from the formations traversed by the bore into the same by applying hydrostatic pressure to such formations, and fulfilling other purposes.

In locations where the underground formations traversed and/or penetrated by the bore contain materials such as hydratable clays which swell and/or disintegrate in the presence of water, it has become customary to employ drilling fluids which are substantially free of water in order to preclude the introduction of water into the bore by means of the drilling fluid. Such drilling fluids are termed "oil-base" fluids since they usually comprise a mineral oil having dispersed or suspended therein minor proportions of various agents adapted to impart special properties to the composition. Among such agents, the most universally employed are: weighting agents, which are high density inert solids adapted to increase the apparent density of the base oil and thus increase the hydrostatic head provided by the drilling fluid within the bore; wall-building agents, which are materials such as clay or asphalt adapted to coat or plaster the walls of the bore with an impermeable layer which prevents the escape of the drilling fluid into permeable formations; and dispersing agents which serve to maintain solid components of the fluid uniformly dispersed therein. Oil-base drilling fluids may also comprise a variety of other agents such as gel strength improvement agents, viscosity modifiers, emulsifying agents, protective colloids, inorganic salts, etc.

Among the various general types of oil-base drilling fluids, those in which the wall-building agent comprises a hydratable clay such as bentonite and the dispersing agent comprises an oil-dispersible metal soap have proved highly satisfactory, particularly for use as a completion fluid in drilling into the producing formation subsequent to drilling the upper portion of the bore with a water-base fluid. The latter type of fluid usually comprises an aqueous dispersion of hydrated clay, and while it is often possible to use this type of fluid in drilling the upper portion of the bore, if such fluid is employed in drilling into the producing formation there is considerable danger of plugging the pores of such formation with gel-like particles of hydrated clay, thereby shutting off or impeding the flow of oil or gas. Accordingly, it has become common practice in some localities to drill down to the producing formation with a water-base fluid, and then to replace such fluid with an oil-base fluid for completion of the bore into the producing formation.

In my co-pending application, Serial No. 105,067, filed July 15, 1949, now U. S. Patent No. 2,542,020, there are described and claimed oil-base drilling fluids prepared by dispersing in mineral oil minor amounts each of an alkali-metal alkali partial saponification product of heat-treated rosin, such as the partial potassium soap of decarboxylated rosin; an alkaline-earth metal base, such as calcium hydroxide; a hydratable clay, such as bentonite; and water. The alkaline-earth metal base reacts by metathesis with the saponified rosin product to form the corresponding alkaline-earth metal rosin soap which serves at least in part as an oil-dispersible dispersing agent. The drilling fluids so prepared have highly desirable properties, and have met with considerable commercial success. However, they are not well suited for use in the presence of relatively large amounts of water and hydratable clay. Most types of naturally occurring hydratable clays are sodium-base clays which, in the hydrated form, are readily dispersible in fresh water. However, sodium-base clays react by metathesis with alkaline-earth metal bases in the presence of water to form the corresponding alkaline-earth metal-base clays which are substantially non-dispersible in water and/or oil. Accordingly, since the above-described type of drilling fluid almost invariably contains some free un-metathesized alkaline-earth metal base as well as an alkaline-earth metal soap, when such fluid is employed in the presence of sufficient water and a hydratable clay the latter reacts with the alkaline-earth metal base and/or soap to form the corresponding alkaline-earth metal-base clay. As previously stated, such clay is not normally dispersible in water and/or oil systems, and even though in the present instance a soap-type dispersing agent is present in the drilling fluid, such agent is not capable of dispersing the alkaline-earth metal-base clay in the fluid to form a uniform composition. As a consequence, when a drilling fluid of the present type comes in contact with a hydratable clay in the presence of sufficient water, the clay is changed by chemical reaction into a non-dispersible form which settles out of the fluid in the form of a heavy sludge. In some instances, such sludge is comprised of relatively small particles of non-dispersed clay. In other cases, the clay agglomerates into balls or clumps which may be as large as several inches in diameter, and may completely fill the body of the fluid. In either case, the non-dispersed clay sludge seriously interfere with the drilling operation by cloggiing the shaker screens, filling up the mud ditches and settling pits, rendering pumping of the fluid very difficult if not impossible, etc. In many instances, accumulation of such sludge in the fluid requires that the entire drilling operation be discontinued and the drilling fluid replaced with a fresh batch.

It will be understood that the above-described phenomena do not occur except under conditions where the drilling fluid comes in contact with a hydratable clay in the presence of a substantial quantity of water. However, such conditions may occur in several ways, and are by no means rare. For example, the oil-base drilling fluid may become contaminated with water either as a result of water entering the hole from water-bearing formations traversed by the bore or as a result of surface water getting into the mud ditches, settling pits, etc. When the drilling fluid becomes contaminated with water to an extent of about 15 per cent or greater, and thereafter comes in contact with a hydratable clay, for example a sub-surface clay-bearing formation, the above-described sludge formation and attendant difficulties occur. Sludge formation also occurs when the oil-base fluid is used to replace a water-base fluid in the previously-described type of completion practice, since a substantial quantity of the aqueous hydrated clay water-base fluid invariably becomes admixed with the oil-base completion fluid. Sludge formation similarly occurs in other instances wherein clay and a substantial quantity of water become admixed with an alkaline-earth metal base-containing drilling fluid.

It is accordingly an object of the present invention to provide means for preventing the accumulation of clay sludge in oil-base drilling fluids of the aforesaid type.

Another object is to provide means for treating water-contaminated oil-base drilling fluids of the aforesaid type so as to prevent the accumulation of clay sludge when the water-contaminated fluid subsequently comes in contact with a hydratable clay.

A further object is to provide oil-base drilling fluids especially adapted for use in completion practice carried out subsequent to drilling operations in which a water-base drilling fluid has been employed.

Other objects will be apparent from the following detailed description of the invention, and various advantages not specifically referred to herein will occur to those skilled in the art upon employment of the invention in practice.

I have now found that the above and related objects may be realized by providing in the oil-base fluid a small but effective amount of a particular type of non-ionic surface active agent capable of maintaining alkaline-earth metal-base clays substantially uniformly dispersed in the fluid. More particularly, I have found that certain hydroxypolyoxyethylene ethers of long chain fatty acid partial esters of sorbitan are capable of dispersing alkaline-earth metal-base clays in oil-base drilling fluids of the present type. Accordingly, by incorporating into the fluid a relatively small amount of such surface active agent, the aforementioned difficulties associated with the use of alkaline-earth metal base-containing oil-base drilling fluids in the presence of water and hydratable clay are overcome, and the field of use of this type of drilling fluid is greatly extended. The surface active agent maintains the alkaline-earth metal-base clay which is formed under such circumstances uniformly suspended in the fluid, and prevents it from accumulating in the fluid in the form of a heavy sludge or agglomerated balls or clumps. Also, the particular surface active agents employed do not in any way detract from the desirable physical properties of the fluid, and the excellent viscosity, fluid loss and gel strength characteristics of this type of fluid are retained to their fullest extent.

The invention thus consists in improved drilling fluid compositions prepared by dispersing in mineral oil a minor proportion each of an alkali-metal alkali partial saponification product of heat-treated rosin of the type hereinafter more fully described, an alkaline-earth metal base, a hydratable clay, a hydroxypolyoxyethylene ether of a long chain fatty acid partial ester of sorbitan, and water. These compositions are complex colloidal systems whose exact chemical composition is made uncertain by the fact that certain of the components react with each other to an unknown extent. Accordingly, these compositions are herein described and claimed by their method of preparation rather than in terms of their chemical composition which at best can be only speculative.

COMPONENTS

The base oil which forms a major component of the new drilling fluid compositions is preferably of mineral origin and may be crude petroleum or a distillate or residuum material. Heavier materials such as light tars, cracked residua, heavy extracts and the like are especially well suited, particularly when blended with a light distillate such as gas oil, diesel fuel, etc. A highly satisfactory mixed base of this type comprises a major proportion, e. g., 60–95 per cent, of a relatively heavy oil such as a light residual oil having a specific gravity of about 13°–15° API and a viscosity of about 30–40 seconds SSF at 122° F. and containing substantial amounts of asphaltenes, polymeric bodies and the like, and a minor proportion, e. g., 5–40 per cent, of a light distillate such as a diesel fuel having a specific gravity of about 25°–35° API and a viscosity of about 30–50 SUS at 100° F. The invention, however, is not limited to the use of any particular type of oil or mixtures thereof, and any of the oil bases known in the art may be satisfactorily employed.

The saponified rosin product which is provided in the new compositions for the primary purpose of maintaining oil-insoluble components uniformly and stably dispersed in the oil phase is the product obtained by reacting wood or gum rosin which has previously been heat-treated to modify the resin acids with an alkali-metal alkali, e. g., sodium hydroxide, sodium carbonate, potassium hydroxide, etc., in such manner that the saponification reaction is only partially complete and the saponified product contains from about 1 to about 15 per cent of free unsaponified resin acids. The heat-treatment of rosin, whereby the resin acids thereof are isomerized and/or otherwise modified, is well known in the naval stores art, and may be effected in various ways to obtain modified rosin products which vary somewhat in their physical and chemical properties depending upon the nature and extent of the heat-treatment. Thus, any of the various color grades of refined wood or gum rosin may be heated under non-oxidizing conditions at temperatures between about 250° C. and about 350° C. for a length of time sufficient to raise the specific rotation of the rosin from its original negative value to a value between about +5° and about +15°. The resulting rosin product closely resembles the original rosin in appearance, ease of saponification, etc., but is considerably altered chemically as evidenced by its increased specific rotation, increased dehydroabietic acid content, lower iodine number, etc. By carrying out the heat-treatment at somewhat higher temperatures and/or over longer periods of time, the specific rotation may be raised further, e. g., to +25° or even higher, and the degree of olefinic unsaturation further decreased. Also, under such conditions decarboxylation takes place with the formation of unsaponifiable bodies which are usually referred to as rosin oils. The heat-treatment of rosin to secure the desired modification of the resin acids as indicated by increase in specific rotation to a value above about +5° may also be effected in the presence of catalysts at relatively low temperatures as described in U. S. Patent No. 2,154,629. The catalysts employed are of the hydrogenation type, e. g., metallic platinum or palladium, although the treatment is carried out in the absence of added hydrogen. The reaction which takes place is termed "disproportionation" since it involves the simultaneous hydrogenation and dehydrogenation of abietic-type acids with the consequent formation of dihydroabietic and dehydroabietic acids and their analogues, and the resulting product is referred to as "disproportionated rosin." Similarly, the product obtained by heat-treating rosin under conditions sufficiently drastic that carboxyl groups are removed from the rosin acids is termed "decarboxylated rosin," and the product obtained by heat-treating rosin under less drastic conditions so that the change effected is substantially only one of molecular rearrangement is referred to as "isomerized rosin." All of these modified rosin products are characterized by having been prepared by heat-treating rosin under conditions of time and temperature, and in the presence or absence of a hydrogenation catalyst but in the absence of added hydrogen, sufficient to raise the specific rotation of the rosin to a value above about +5°.

Any of the above described modified rosin products may be used to obtain the saponification products employed in preparing the drilling fluid compositions of the present invention. Procedure for carrying out the saponification reaction is well known in the art, and in general consists merely of adding the modified rosin in the solid or molten state to a hot aqueous solution of the desired alkali-metal alkali and thereafter heating the mixture until the reaction is complete and the product contains the desired amount of water. The amount of alkali employed is somewhat less than that required for the complete saponification of the resin acids in order that the saponification product may contain the requisite amount of free unsaponified resin acids. The concentration of the aqueous alkali is usually so adjusted that the product obtained takes the form of a viscous liquid or thick paste containing 60–85 per cent solids. The physical form of the product also depends somewhat upon the type of modified rosin employed. The saponification product obtained from decarboxylated wood rosin containing a substantial amount of rosin oils, for example, is a relatively fluid liquid even though it may contain only 5–10 per cent of water.

While any of the alkali-metal alkali saponification products of rosin which has been heat-treated to raise its specific rotation to a value above about +5° may be employed in preparing the present drilling fluids, I have found that superior results, particularly with respect to the fluid loss value of the drilling fluid are attained by employing either of two specific products of this type. The first of such preferred saponification products is an alkali-metal alkali saponification product of rosin which has been heat-treated at temperatures between about 250° C. and about 350° C. in the absence of a catalyst to such an extent that it contains only about 50–60 per cent of free resin acids, 30–40 per cent of unsaponifiable oils, and small amounts of phenolic materials, water, and products of unknown constitution. A particularly preferred product of this type is the potassium hydroxide saponification product of such heat-treated rosin containing about 45–55 per cent potassium resin acid soaps, about 30–35 per cent unsaponifiable materials, about 5–10 per cent free resin acids, and about 5–10 per cent water. The second of the preferred class of saponification products is the product obtained by heating rosin at a temperature of about 225°–300° C. for about 15–60 minutes in contact with a palladium catalyst, distilling the resulting product and collecting a fraction distilling at about 210°–275° C. under about 5–10 mm. pressure, and thereafter saponifying such fraction with aqueous sodium hydroxide in the known manner. Such product is available commercially under the trade name "Dresinate 731."

The alkaline-earth metal base employed in preparing the new drilling fluids may be any oxide, hydroxide or basic salt of any of the alkaline-earth metals, e. g., calcium oxide, calcium hydroxide, barium hydroxide, strontium hydroxide, calcium acetate, etc. Calcium hydroxide, e. g., ordinary hydrated lime, and calcium oxide are preferred for reasons of low cost and general availability.

The hydratable clay component is preferably a high quality material such as bentonite, montmorillonite, or kaolinite, but may be common clay such as is available in almost any locality. Bentonite is preferred. Similarly, the water component should also be relatively pure or "fresh."

The non-ionic surface active agents which are provided in the new compositions for the purpose of dispersing any alkaline-earth metal-base clays which may be formed as a result of the composition coming in contact with substantial quantities of water and hydratable clay are hydroxypolyoxyethylene ethers of long chain fatty acid partial esters of sorbitan. Such agents are available commercially under the generic trade name "Tween." They are prepared from sorbitol by the following series of operations:

1. Esterification of one or more, but not all, of the hydroxyl groups of sorbitol molecule with a long chain fatty acid, e. g., oleic acid, stearic acid, palmitic acid, lauric acid, and other fatty acids containing at least 12 carbon atoms, to form a sorbitan partial ester.

2. Etherification of the remaining hydroxyl group or groups of said partial ester with ethylene oxide to form a hydroxypolyoxyethylene ether thereof. The quantity of ethylene oxide employed should be such that the ether product contains from 10 to 30 oxyethylene groups.

Means for carrying out these reactions are well known in the art, and further details concerning the preparation of the products in question are set forth in that portion of U. S. Patent No. 2,380,166 which relates to the preparation of the so-called "Type B emulsifiers." These products are for the most part oily yellow liquids which are soluble in water, acetone, alcohol and other common organic solvents. They vary in viscosity from about 250 to about 600 cps. at 25° C., depending upon the nature of the long chain fatty acid residue, the number of such residues in the molecule, and the length of the hydroxypolyoxyethylene chains. As examples of the surface active agents of the present group these may be mentioned hydroxypolyoxyethylene sorbitan monolaurate, hydroxypolyoxyethylene sorbitan monopalmitate, hydroxypolyoxyethylene sorbitan mono-oleate, hydroxypolyoxyethylene sorbitan tri-oleate, etc. While any of such products may be employed in preparing the drilling fluid compositions of the present invention, best results are attained through the use of those products which have a hydrophile-lipophile balance value (abbreviated HLB value) above about 12. The HLB value is an emperical numerical value which expresses the relative hydrophilic and lipophilic properties of the product under consideration. A high HLB value is indicative of strong hydrophilic properties, whereas a low HLB value indicates strong lipophilic properties. The products which have HLB values above about 12 and which are preferred for use according to the present invention are highly hydrophilic. A particularly preferred material is the hydroxypolyoxyethylene sorbitan monolaurate product having an HLB value of about 16.7, which is sold under the trade name "Tween 20." Further information concerning these materials and their HLB values is set forth in "Atlas Surface Active Agents," Atlas Powder Company, Wilmington, Delaware, 1950.

PROPORTIONS

The proportions in which the various essential components are employed may be varied between certain limits depending upon the identity of such components and the specific properties desired in the composition. Ordinarily, however, the saponified heat-treated rosin product is employed in an amount representing between about 1 and about 10, preferably between about 4 and about 8, per cent by weight of the entire composition. The alkaline-earth metal base is employed in an amount corresponding approximately to that chemically equivalent to the saponified rosin product. When the latter is one of the preferred products hereinabove described and the alkaline-earth metal base is calcium oxide or hydroxide, the saponification product is provided in the above-mentioned amount and the base is employed in an amount representing between about 0.1 and about 5, preferably between about 0.4 and about 2, per cent by weight of the entire composition. The hydratable clay is employed in an amount representing between about 0.1 and about 5, preferably between about 0.4 and about 1.2, per cent by weight of the entire composition, and the water is provided in an amount representing between about 0.2 and about 10, preferably between about 1 and about 5, per cent by weight of the entire composition. These proportions of water include any water which may be contained in the saponified rosin product and/or other components, and accordingly the amount of water actually added during preparation of the composition will be adjusted according to the water content of the other components so that the final composition will contain water in the above-mentioned proportions. The hydroxypolyoxyethylene ether surface active agent is employed in an amount representing between about 0.05 and about 2, preferably between about 0.1 and about 1, per cent by weight of the entire composition.

PROCEDURE

The exact manner in which the various components are dispersed in the base oil is not of primary importance, and if desired the requisite amount of each may simply be added to the entire quantity of the base oil at ordinary temperatures while employing more or less vigorous agitation or stirring to secure a uniform composition. Such operation may be carried out at the well site in the conventional mud pits with agitation being effected by circulating the mixture from one pit to another. However, it is often more convenient to prepare an initial concentrate composition which can subsequently be diluted with the base oil to obtain the finished drilling fluid. Thus, the saponification product, alkaline-earth metal base, clay, water and surface active agent may be dispersed in a portion of the base oil to form a relatively thick viscous composition which can be stored and shipped in drums, and subsequently be diluted with the remainder of the base oil to obtain the finished product. When the base oil comprises a mixture of a light and a heavy oil, it is preferred that the light oil be employed in forming the initial dispersion. According to one mode of procedure, the alkaline-earth metal base is suspended in a portion of the base oil, after which the saponification product is added with vigorous stirring. The hydratable clay, water and surface active agent are then added, and stirring is continued to obtain a homogenous concentrate composition which may subsequently be diluted with the remainder of the base oil. Alternatively, the concentrate composition may comprise only the saponification product, clay, water and surface active agent dispersed in a portion of the base oil, with the alkaline-earth metal base being added along with the remainder of the base oil at some later time. Weighting agents, gel strength agents and other optional components are usually added along with or subsequent to dilution of the concentrate to form the finished product.

Usually, the drilling fluid compositions of the invention will be prepared by combining the individual components thereof as just described. However, they may also be obtained by suitably modifying previously prepared compositions of the proper type. Thus, any of the drilling fluids of the type prepared by dispersing an alkali-metal alkali partial saponification product of heat-treated rosin, an alkaline-earth metal base, a hydratable clay and water in a base oil may be adapted for use in the presence of water and hydratable clays according to the invention simply by adding thereto the requisite amount of one of the herein described non-ionic surface active agents.

The manner in which the oil-base drilling fluids of the present type are affected by water-base drilling fluid contamination is demonstrated by the data set forth in Table I, below. These data were obtained by adding varying amounts of a typical water-base fluid, which comprised 565 parts of Rogers Lake clay dispersed in 1500 parts of water, to separate samples of an oil-base fluid which had been prepared by dispersing minor amounts each of the previously described sodium hydroxide saponification product of distilled disproportionated rosin, hydrated lime, clay and water in a base oil consisting of a mixture of a light diesel fuel and a light fuel oil as hereinbefore described. Finely-divided whiting was added as a weighting agent, and each sample of mixed water- and oil-base fluid was stirred for 100 minutes at room temperature and for 20 minutes at 160° F. to simulate drilling conditions. The samples were then examined for sludge formation. The following results were observed:

*Table I*

| Sample No. | Percent Oil-Base Fluid | Percent Water-Base Fluid | Appearance |
| --- | --- | --- | --- |
| 1 | 100 | 0 | Uniform, oily. |
| 2 | 98.2 | 1.8 | Do. |
| 3 | 94.7 | 5.3 | Do. |
| 4 | 89.3 | 10.7 | Uniform, grainy. |
| 5 | 83.3 | 16.7 | Very grainy, slight sludge separation. |
| 6 | 78.0 | 22.0 | Extensive sludge separation. |
| 7 | 68.0 | 32.0 | Solid sludge. |
| 8 | 49.0 | 51.0 | Solid grease-like mass. |

Samples Nos. 7 and 8 were entirely too thick to be circulated. It will be noted that the aforementioned sludge formation occurs when the water-base fluid contamination becomes greater than about 15 per cent.

The effect of adding various dispersing agents to an oil-base fluid which has become contaminated with a water-base fluid is illustrated by the data set forth in Table II, below. A mixture of water-base and oil-base fluids corresponding to Sample No. 6, above, was prepared and divided into a number of samples. Each sample was stirred for about 100 minutes, after which its physical appearance was noted. To each sample there was then added the indicated quantity of the dispersing agent, and after stirring for 20 minutes at about 160° C. the physical appearance was again noted. The observations are tabulated as follows:

*Table II*

| Sample No. | Appearance after Stirring for 100 Min. | Dispersing Agent Identity | Percent Added | Appearance after Adding Dispersing Agent and Stirring 20 Min. at 160° C. |
| --- | --- | --- | --- | --- |
| 9 | Solid sludge | Carboxymethyl cellulose | 0.2 | Heavy sludge separation amounting to 45% by volume. |
| 10 | do | Sorbitan monolaurate | 0.1 | Heavy sludge separation amounting to 65% by volume. |
| 11 | do | Bentonite | 6.0 | Heavy sludge separation amounting to 75% by volume. |
| 12 | do | Hexadecylamine | 0.2 | Heavy sludge separation amounting to 60% by volume. |
| 13 | do | Saponified disproportionated rosin. | 0.2 | Heavy sludge separation amounting to 40% by volume. |
| 14 | do | Sodium silicate | 0.4 | Heavy sludge separation amounting to 50% by volume. |
| 15 | do | Sorbitan monopalmitate | 0.1 | Heavy sludge separation amounting to 55% by volume. |
| 16 | do | Sorbitan monostearate | 0.1 | Do. |
| 17 | do | Sorbitan mono-oleate | 0.1 | Do. |
| 18 | do | Hydroxypolyoxyethylene sorbitan monolaurate (Tween 20). | 0.2 | Uniform fine grainy fluid. |
| 19 | do | do | 0.1 | Do. |

It will be noted that of the various dispersing agents tested only the hydroxypolyoxyethylene ethers of sorbitan mono fatty esters were effective on dispersing the sludge. Even the closely-related sorbitan esters were ineffective for this purpose.

The following examples illustrate a number of compositions embodying the principle of the invention, but are not to be construed as limiting the same. All proportions are given in parts or per cent by weight.

EXAMPLE I

Approximately 3350 parts of Dresinate 731, 700 parts of water, and 1100 parts of bentonite are dispersed in a mixed base oil comprising 2350 parts of light diesel fuel and 1400 parts of light fuel oil. The light diesel fuel is a typical 400°–720° F. boiling range petroleum fraction, and has an API gravity of about 31° and a viscosity of about 40 SUS at 100° F. The fuel oil is a heavier fraction having an API gravity of about 14.5° and a viscosity of about 36 SSF at 122° F. Approximately 1800 parts of the resulting concentrate composition are then diluted with about 16,500 parts of the fuel oil, and there is then added about 38 parts of hydrated lime. The resulting mixture is stirred for about ½ hour, whereby the lime and sodium soap react by metathesis to form the corresponding calcium soap. About 55 parts of hydroxypolyoxyethylene sorbitan monopalmitate having an HLB value of about 15.6 (Tween 80) are then stirred into the composition and the product is stored until ready for use. This oil-base drilling fluid is resistant to sludge formation even when contaminated with as much as 30 per cent of water and clay.

EXAMPLE II

| | Per cent by weight |
|---|---|
| Light mineral oil (36° API) | 20.0 |
| Heavy mineral oil (15° API) | 69.0 |
| Saponified decarboxylated rosin | 4.0 |
| Water | 4.0 |
| Bentonite | 2.0 |
| Calcium oxide | 0.4 |
| Hydroxypolyoxyethylene sorbitan monooleate | 0.6 |
| | 100.00 |

The saponified decarboxylated rosin product is the potassium hydroxide saponification product of decarboxylated rosin obtained by heating wood rosin at about 280–320° C. for 2–4 hours. It is a dark-colored highly viscous fluid comprising about 50 per cent of the potassium soaps of modified rosin acids, about 7 per cent of unsaponified rosin acids, about 33 per cent of unsaponifiable rosin oils and about 10 per cent of water. The mixing procedure is the same as that employed in Example I.

EXAMPLE III

| | Per cent by weight |
|---|---|
| Crude petroleum | 84.5 |
| Sodium soap of disproportionated rosin | 3.0 |
| Potassium soap of decarboxylated rosin | 2.0 |
| Bentonite | 5.0 |
| Water | 2.5 |
| Hydrated lime | 1.0 |
| Hydroxypolyoxyethylene sorbitan monolaurate | 2.0 |
| | 100.0 |

EXAMPLE IV

| | Per cent by weight |
|---|---|
| Light mineral oil (22° API) | 79.7 |
| Sodium soap of disproportionated rosin | 6.3 |
| Bentonite | 5.0 |
| Water | 5.5 |
| Hydrated lime | 2.5 |
| Hydroxypolyoxyethylene sorbitan monostearate | 1.0 |
| | 100.0 |

This composition is weighted to an apparent density of 120 lbs./cu. ft. by the addition of 200-mesh whiting. Barytes, iron oxide, fuller's earth and other conventional weighting agents may be substituted for the whiting.

Other modes of applying the principle of my invention may be employed instead of those explained, change being made as regards the methods or materials employed, provided the compositions stated by any of the following claims, or the equivalent of such stated compositions, be obtained.

I therefore, particularly point out and claim as my invention:

1. A drilling fluid composition prepared by dispersing in mineral oil between about 1 and about 10 per cent by weight of a saponified rosin product obtained by saponifying with an aqueous alkali-metal alkali rosin which has been heat-treated at a temperature between about 250° C. and about 350° C. for a period of time sufficient to raise its specific rotation to a value above about +5°, said saponified rosin product containing between about 1 and about 15 per cent by weight of free rosin acids; between about 0.1 and about 5 per cent by weight of a hydratable clay; an alkaline-earth metal base in an amount corresponding approximately to that chemically equivalent to the quantity of said saponified rosin product present; between about 0.2 and about 10 per cent by weight of water; and between about 0.05 and about 2 per cent by weight of a hydroxypolyoxyethylene ether of a long chain fatty acid partial ester of sorbitan.

2. A composition as defined by claim 1 wherein the saponified rosin product is a potassium hydroxide saponification product of wood rosin which has been heated at a temperature between about 250° C. and about 350° C. for a period of time sufficient to raise its specific rotation to a value above about +5°, and comprises between about 45 and about 55 per cent of potassium resin acid soaps, between about 30 and about 35 per cent of unsaponifiable materials, between about 5 and about 10 per cent of free resin acids, and between about 5 and about 10 per cent of water.

3. A composition as defined by claim 1 wherein the saponified rosin product is a sodium hydroxide saponification product of distilled disproportionated rosin.

4. A composition as defined by claim 1 wherein the alkaline-earth metal base is selected from the class consisting of calcium oxide and calcium hydroxide.

5. A composition as defined by claim 1 wherein the hydroxypolyoxyethylene ether of a long chain fatty acid partial ester of sorbitan is one containing from 10 to 30 oxyethylene groups.

6. A composition as defined by claim 1 wherein the hydroxypolyoxyethylene ether of a long chain fatty acid partial ester of sorbitan is hydroxypolyoxyethylene sorbitan monolaurate having a hydrophile-lipophile balance value of about 16.7.

7. A drilling fluid composition prepared by dispersing in mineral oil between about 4 and about 8 per cent by weight of a saponified rosin product selected from the class consisting of (1) a potassium hydroxide saponification product of wood rosin which has been heated at a temperature between about 250° C. and about 350° C. for a period of time sufficient to raise its specific rotation to a value above about +5°, said saponified rosin product comprising between about 45 and about 55 per cent of potassium resin acid soaps, between about 30 and about 35 per cent of unsaponifiable materials, between about 5 and about 10 per cent of free resin acids, and between about 5 and about 10 per cent of water, (2) a sodium hydroxide saponification product of distilled disproportionated rosin, and (3) mixtures of (1) and (2); between about 0.4 and about 1.2 per cent by weight of a hydratable clay; between about 0.1 and about 5 per cent by weight of an alkaline-earth metal base; between about 2 and about 5 per cent by weight of water; and between about 0.1 and about 1 per cent by weight of a hydroxypolyoxyethylene ether of a long chain fatty acid ester of sorbitan.

8. A composition as defined by claim 7 wherein the alkaline earth metal base is selected from the class consisting of calcium oxide and calcium hydroxide.

9. A composition as defined by claim 7 wherein the hydroxypolyoxyethylene ether of a long chain fatty acid ester of sorbitan contains from 10 to 30 polyoxyethylene groups.

10. A composition as defined by claim 7 wherein the hydroxypolyoxyethylene ether of a long chain fatty acid partial ester of sorbitan is hydroxypolyoxyethylene sorbitan monolaurate having a hydrophile-lipophile balance value of about 16.7.

PAUL W. FISCHER.

REFERENCES CITED

The following references are of record in the file of this patent:

UNITED STATES PATENTS

| Number | Name | Date |
|---|---|---|
| 2,463,823 | Weitkamp | Mar. 8, 1949 |
| 2,542,019 | Fischer | Feb. 20, 1951 |
| 2,542,020 | Fischer | Feb. 20, 1951 |

OTHER REFERENCES

"Atlas Surface Active Agents" by Atlas Powder Co., p. 8 (1948).